D. H. CHURCH.
METHOD OF MAKING BIMETALLIC BALANCES FOR WATCHES.
No. 11,372. Reissued Oct. 10, 1893.
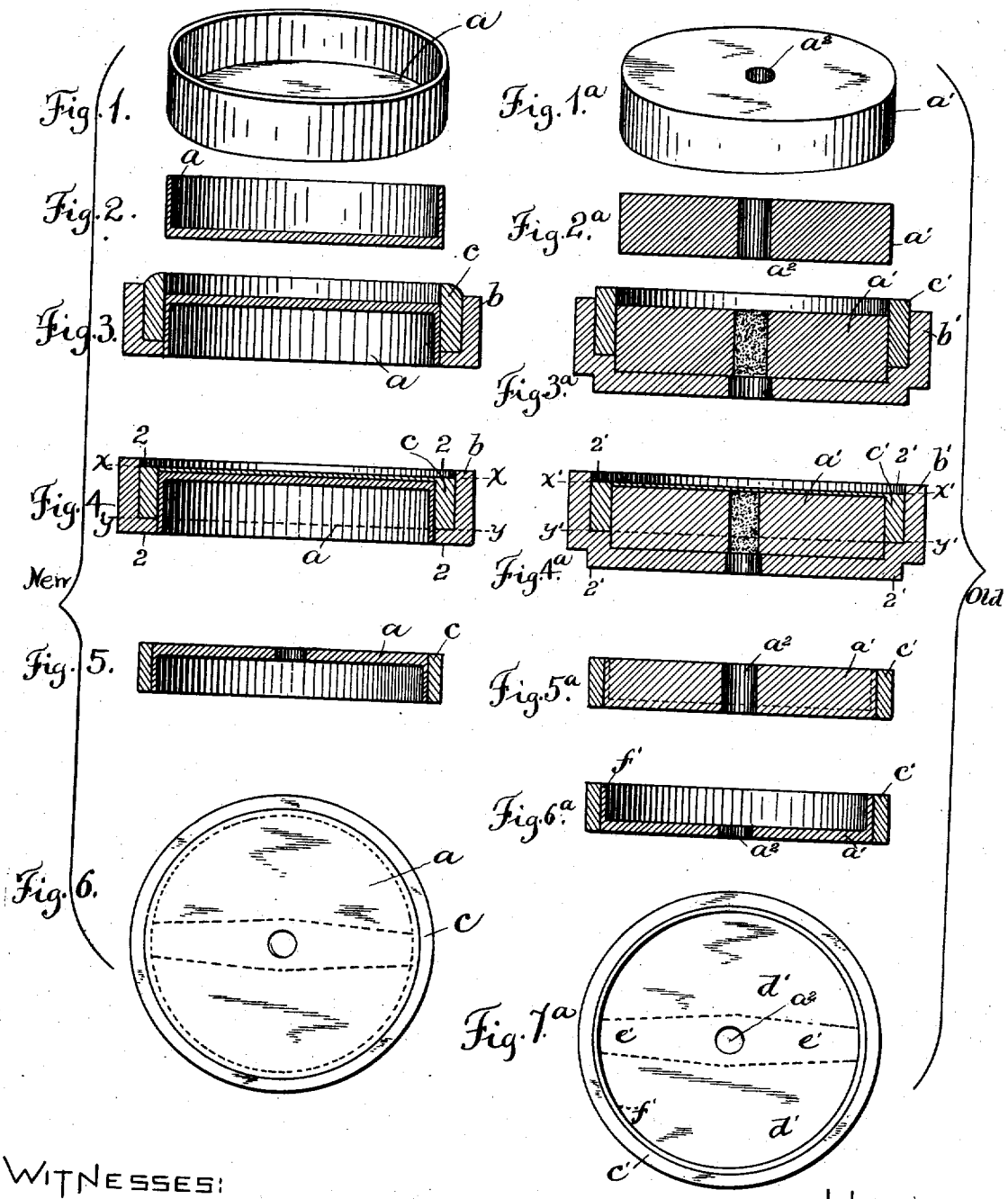
WITNESSES:
M. W. Jackson
A. D. Harrison
INVENTOR:
D. H. Church
by Wright Brown & Crosby
ATTYS

UNITED STATES PATENT OFFICE.

DUANE H. CHURCH, OF NEWTON, MASSACHUSETTS.

METHOD OF MAKING BIMETALLIC BALANCES FOR WATCHES.

SPECIFICATION forming part of Reissued Letters Patent No. 11,372, dated October 10, 1893.

Original No. 474,590, dated May 10, 1892. Application for reissue filed June 8, 1892. Serial No. 436,020.

*To all whom it may concern:*

Be it known that I, DUANE H. CHURCH, of Newton, in the county of Middlesex and State of Massachusetts, have invented certain new and useful Improvements in Methods of Making Bimetallic Balances for Watches, of which the following is a specification.

The invention has for its object to reduce the cost and simplify the operation of making a watch-balance, the rim of which is composed of two bands or laminæ of different metals, the outer lamina being usually of brass and the inner one of steel.

The invention consists in the improved method which I will now proceed to describe and claim.

Of the accompanying drawings, forming a part of this specification, Figure 1 represents a perspective view of one of the blanks used in making a watch-balance in accordance with my invention. Fig. 2 represents a sectional view of the same. Fig. 3 represents a sectional view of said blank inverted and placed in a capsule, with the ring or blank constituting an outer lamina of the balance. Fig. 4 represents the parts shown in Fig. 3 after the ring or blank has been fused. Fig. 5 represents the partially-completed watch-balance after the removal of the surplus material shown in Fig. 4. Fig. 6 represents a plan view of the blank shown in Fig 5. Figs. $1^a$, $2^a$, $3^a$, $4^a$, $5^a$, $6^a$, and $7^a$ represent views illustrating the ordinary method of making balances of this class.

The same letters of reference indicate the same parts in all the figures.

Before describing my invention, I will describe by reference to Figs. $1^a$ to $6^a$, inclusive, the ordinary method of making a bimetallic watch-balance. A cylindrical blank or button $a'$, which is of the same external diameter as the inner lamina of the completed balance, is placed in a capsule $b'$, which capsule is formed, as shown in Figs. $3^a$ and $4^a$, to fit only the lower edge of the blank $a'$, leaving an annular space outside of the main portion of the periphery of said blank. A ring or blank $c'$, which constitutes the outer lamina of the balance, is placed in said annular space, said ring being usually of brass. The ring $c'$ is then fused by heat, and thus closely united to the periphery of the blank $a'$, the ring having sufficient surplus metal to cause it to cover or partially cover the upper surface of the blank $a'$ when fused as shown in Fig. $4^a$. The blanks $a'$ $c'$ and capsule $b'$ are firmly united by the fusing operation. After this the metal outside of the dotted lines $x'$ $x'$ $y'$ $y'$ and $z'$ $z'$ is dressed off or removed by a suitable means, leaving the balance in the form in cross-section shown in Fig. $5^a$. The next operation is the removal of that portion of the blank $a'$ indicated by the dotted line in Fig. $5^a$, the partially-completed balance being thus given the form shown in Fig. $6^a$. The removal of the metal from the blank $a'$ forms the inner surface of the inner lamina $f'$ of the balance and leaves a web or plate extending across the said inner lamina, said plate furnishing the material for the arms that connect the rim with the staff or arbor of the balance, said arms being formed by punching said plate to remove therefrom the pieces, $d'$, surrounded by dotted lines in Fig. $7^a$, and leave as the said arms the portions $e'$ $e'$, which are integral with the inner lamina $f'$. The removal of the surplus parts of the material required to give the balance the form shown in Fig. $6^a$ must be effected while the balance is supported and rotated by a spindle inserted in the central hole $a^2$ of the blank $a'$, suitable turning-tools being employed to remove the surplus metal. Said hole is so small that the spindle is necessarily slender and weak, so that considerable care is required in the turning operation to avoid springing and breaking the spindle. Hence the turning-off operation is necessarily slow and expensive. This constitutes one objection to the method now under consideration. Another objection to said method is the necessity of cutting out a large portion of the blank $a'$ in forming the inner surface of the inner lamina, it being necessary to hold the balance formed as in Fig. $5^a$ in a rotating chuck while the form shown in Fig. $6^a$ is being imparted to it by a turning tool. This operation consumes a considerable amount of time and adds materially to the cost of manufacture.

In carrying out my invention I avoid both of the objections above mentioned, by the following steps.

I first form a cupped or flanged steel blank $a$, Figs. 1 and 2, the same comprising a flange, which constitutes the inner lamina of the balance, and a web or plate, which is afterward punched to form the arms of the balance. The cupped blank may be formed in any suitable way such as by spinning up a flange on a circular steel disk, the flange being preferably considerably thinner than the body of the disk, because the inner lamina of the completed balance is thinner than the arms of the balance. I place the blank *a* in a capsule *b* in an inverted position, the web or flat part of the blank being at the top, as shown in Fig. 3. The capsule is formed to bear on only the periphery of the flange, leaving the cavity or recess of the blank open and unobstructed. The capsule is also formed to hold the brass ring or blank *c*, which constitutes the outer lamina of the balance, in contact with the outer surface of the flange of the blank *a*. The ring *c* is then inserted and fused, and thus united to the blank *a* and to the capsule, the said ring having sufficient surplus metal projecting above the blank to form, when fused, a thin sheet extending across the top surface of the bottom of the inverted cupped blank, as shown in Fig. 4, after which the incipient balance is reduced to the form shown in Fig. 5 by removing the surplus material, as indicated by the lines *x x*, *y y*, and *z z* in Fig. 4, the balance being now substantially the same as shown in Figs. $6^a$ and $7^a$ and requiring only the usual finishing operation, including the punching out of the flat portion of the blank *a* to form the balance-arms, the severing of the rim at two opposite points, and the polishing of the surfaces.

It will be seen that the distinguishing feature of my invention is the employment of a previously formed or cupped blank *a* for the inner lamina and arms of the balance instead of the solid blank *a'* requiring to be cupped or hollowed after the parts of the balance are united. By this improvement I provide the incipient balance with a circular recess in one side—viz: the interior of the cupped blank *a*—which recess permits the blank to be held by a chuck of suitable construction during the operations required in turning off the surplus metal outside of the lines *x x*, *y y*, and *z z*. The said chuck should be formed to enter the recess and bear on the circular margin thereof, which margin is concentric with the axial line of the balance, and therefore enables the chuck to hold and rotate the balance accurately and firmly during the turning operations. It is obvious that the balance can be held in this way much more firmly and accurately than by a spindle inserted in the small hole $a^2$, as above described. Hence the surplus metal can be much more rapidly turned off than heretofore. This is a very important advantage, resulting in a considerable saving in the cost of manufacture. Another reduction in the cost results from the saving of time and labor in striking up or spinning the blank *a* to give it its cupped form instead of turning out the cup from a solid blank *a'*, as heretofore. I do not limit myself, however, to the formation of the cupped blank by a spinning process and may give it its cupped form in any suitable way.

I claim—

1. That improvement in the method of making a bimetallic balance which consists in first making a cupped or flanged blank, the bottom of which furnishes the material for the arms of the balance, while the flange constitutes the inner lamina of the balance-rim, then placing said cupped blank in an inverted position in a capsule formed as shown, then applying a ring or blank for the outer lamina to the exterior of said flange and fusing or otherwise uniting said ring to the flange, and then removing or turning off the metal of the capsule and the surplus metal of the cupped blank and ring, as set forth.

2. That improvement in the method of making a bimetallic balance which consists in first making a cupped or flanged blank, the bottom of which furnishes the material for the arms of the balance, while the flange constitutes the inner lamina of the balance-rim, then placing said cupped blank in a capsule, then applying a ring or blank for the outer lamina to the exterior of said flange and fusing or otherwise uniting said ring to the flange, and then removing or turning off the metal of the capsule and the surplus metal of the cupped blank and ring, as set forth.

3. That improvement in the method of making a bimetallic balance which consists in making a cupped or flanged blank, the bottom of which furnishes the material for the arms of the balance, while the flange constitutes the inner lamina of the balance rim, then applying a ring or blank for the outer lamina to the exterior of said flange, then fusing or otherwise uniting said ring to the flange, and then removing or turning off the surplus metal, as set forth.

In testimony whereof I have signed my name to this specification, in the presence of two subscribing witnesses, this 31st day of May, A. D. 1892.

DUANE H. CHURCH.

Witnesses:
A. D. HARRISON,
M. W. JACKSON.